United States Patent
Goergen et al.

(10) Patent No.: US 10,690,868 B1
(45) Date of Patent: Jun. 23, 2020

(54) THERMAL PROTECTION FOR MODULAR COMPONENTS IN A NETWORK DEVICE

(71) Applicant: CISCO TECHNOLOGY, INC., San Jose, CA (US)

(72) Inventors: Joel Richard Goergen, Soulsbyville, CA (US); Mehmet Onder Cap, Sunnyvale, CA (US); Arjun Jayaprakash, Bengaluru (IN); Damaruganath Pinjala, Bangalore (IN); Marc Henry Mantelli, Los Gatos, CA (US); Umeshbabu Nandanan, San Jose, CA (US); Jatin Kohli, Bangalore (IN); Rohit Dev Gupta, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/154,589

(22) Filed: Oct. 8, 2018

Related U.S. Application Data

(60) Provisional application No. 62/677,271, filed on May 29, 2018.

(51) Int. Cl.
  G02B 6/42 (2006.01)
  G02B 6/44 (2006.01)

(52) U.S. Cl.
  CPC ......... *G02B 6/4269* (2013.01); *G02B 6/4273* (2013.01); *G02B 6/4436* (2013.01)

(58) Field of Classification Search
  CPC .... G02B 6/4269; G02B 6/427; G02B 6/4271; G02B 6/4273; G02B 6/4436; G02B 6/443

USPC .......................................................... 385/92
See application file for complete search history.

(56) References Cited

U.S. PATENT DOCUMENTS

| | | | | |
|---|---|---|---|---|
| 5,430,618 A | * | 7/1995 | Huang | H01R 31/00 174/384 |
| 5,858,149 A | * | 1/1999 | Seo | H01L 21/563 156/150 |
| 5,960,141 A | * | 9/1999 | Sasaki | G02B 6/421 385/88 |
| 6,083,766 A | * | 7/2000 | Chen | H01C 1/01 438/15 |
| 6,478,622 B1 | | 11/2002 | Hwang | |
| 6,540,412 B2 | * | 4/2003 | Yonemura | G02B 6/4246 385/88 |
| 6,606,425 B1 | * | 8/2003 | Crafts | G02B 6/12026 385/129 |

(Continued)

FOREIGN PATENT DOCUMENTS

CN  205846310 U  12/2016

*Primary Examiner* — Thomas A Hollweg
*Assistant Examiner* — Mary A El-Shammaa
(74) *Attorney, Agent, or Firm* — Cindy Kaplan

(57) ABSTRACT

In one embodiment, an apparatus includes an optical module comprising a first end for insertion into a network device and a second end extending from the network device when the optical module is inserted into the network device, and a thermal protective layer extending over a portion of the second end of the optical module, the thermal protective layer preventing direct contact with an external surface of the optical module during removal of the optical module from the network device. The thermal protective layer exposes a portion of the external surface of the second end of the optical module to allow heat to be released from the external surface of the optical module.

18 Claims, 8 Drawing Sheets

(56) References Cited

U.S. PATENT DOCUMENTS

| | | | |
|---|---|---|---|
| 6,780,053 B1* | 8/2004 | Yunker | G02B 6/4201 439/607.2 |
| 7,529,521 B2 | 5/2009 | Yunker et al. | |
| 7,637,672 B1 | 12/2009 | Li et al. | |
| 7,670,178 B2* | 3/2010 | Gu | H01R 13/6583 439/607.01 |
| 7,857,662 B2* | 12/2010 | Gillespie | H01R 13/65802 439/607.3 |
| 7,928,324 B2* | 4/2011 | Moore | G02B 6/4246 174/354 |
| 8,345,439 B1* | 1/2013 | Goergen | H05K 7/1458 361/788 |
| 8,358,504 B2* | 1/2013 | McColloch | G02B 6/4269 361/679.46 |
| 8,414,309 B2* | 4/2013 | Meadowcroft | G02B 6/4214 439/71 |
| 8,488,747 B1* | 7/2013 | Elford | H04M 1/745 361/119 |
| 8,582,025 B2* | 11/2013 | Lin | H04N 5/2253 348/374 |
| 8,934,752 B2* | 1/2015 | Teo | H01R 13/6272 292/197 |
| 8,939,658 B2* | 1/2015 | Heimbuch | G02B 6/36 385/88 |
| 8,974,125 B2* | 3/2015 | McColloch | H04B 10/40 361/676 |
| 9,042,096 B2* | 5/2015 | Thomas | H04L 1/00 361/688 |
| 9,681,572 B2* | 6/2017 | Artman | G06F 1/18 |
| 9,847,607 B2* | 12/2017 | Bopp | H01R 13/42 |
| 2011/0080008 A1* | 4/2011 | Teo | H01R 13/6272 292/197 |
| 2011/0110048 A1* | 5/2011 | Lima | H05K 7/20418 361/720 |
| 2012/0140113 A1* | 6/2012 | Lin | H04N 5/2253 348/373 |
| 2013/0163242 A1* | 6/2013 | Chen | F21V 17/12 362/235 |
| 2013/0178090 A1* | 7/2013 | Teo | H01R 13/6272 439/350 |
| 2015/0187461 A1* | 7/2015 | Potterf | H01R 12/7076 174/76 |
| 2015/0260929 A1* | 9/2015 | Matsumaru | G02B 6/4214 385/52 |
| 2016/0135332 A1* | 5/2016 | Mann | H05K 7/2039 361/706 |
| 2016/0295744 A1* | 10/2016 | Regnier | G02B 6/4269 |
| 2017/0192184 A1* | 7/2017 | Kelty | G02B 6/4269 |
| 2018/0259731 A1* | 9/2018 | Dupeux | G02B 6/423 |

* cited by examiner

THERMAL PROTECTION FOR MODULAR COMPONENTS IN A NETWORK DEVICE

STATEMENT OF RELATED APPLICATION

The present application claims priority from U.S. Provisional Application No. 62/677,271, entitled THERMAL PROTECTION SAFETY FOR OPTICAL MODULES, filed on May 29, 2018. The contents of this provisional application are incorporated herein by reference in its entirety.

TECHNICAL FIELD

The present disclosure relates generally to communications networks, and more particularly, to thermal protection for modular components in a network device.

BACKGROUND

Over the past several years, there has been a tremendous increase in the need for higher performance communications networks. Increased performance requirements have led to an increase in energy use resulting in greater heat dissipation from components. As power dissipation increases, cooling of components is becoming very difficult. The surface temperature of modules in a modular electronic system may reach temperatures that are unsafe for human touch.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
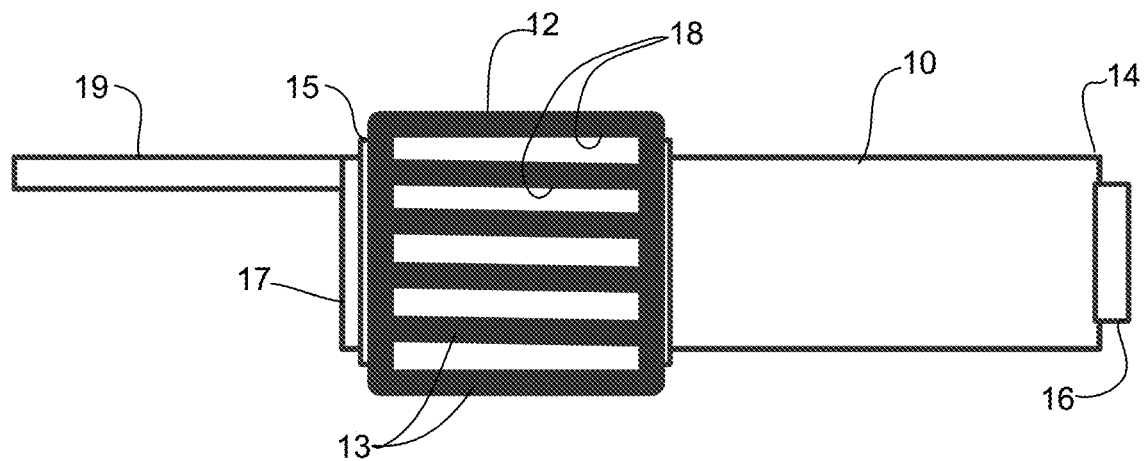
FIG. 1 is a schematic illustrating a thermal protective layer on an optical module, in accordance with one embodiment.

In one embodiment, an apparatus generally comprises an optical module comprising a first end for insertion into a network device and a second end extending from the network device when the optical module is inserted into the network device, and a thermal protective layer extending over a portion of the second end of the optical module, the thermal protective layer preventing direct contact with an external surface of the optical module during removal of the optical module from the network device. The thermal protective layer exposes a portion of the external surface of the second end of the optical module to allow heat to be released from the external surface of the optical module.

In another embodiment, an apparatus generally comprises a module for insertion into a modular electronic system and a thermal protective layer extending over at least a portion of an external surface of the module, the thermal protective layer preventing direct contact with an external surface of the module during removal of the module from the modular electronic system. The thermal protective layer exposes a portion of the external surface of the module to allow heat to be released from the external surface of the module.

In yet another embodiment, an apparatus generally comprises a chassis, a plurality of cards inserted into the chassis, and a plurality of optical modules each comprising a first end inserted into one of the cards and a second end extending from the card, wherein a thermal protective layer extends over at least a portion of the second end of each of the optical modules, the thermal protective layer preventing direct contact with an external surface of the optical module during removal of the optical module from the chassis. The thermal protective layer exposes a portion of the external surface of the second end of the optical module to allow heat to be released from the external surface of the optical module.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Optical modules have increased in speed and power. As optical power dissipation increases, cooling optical components is becoming very difficult. Pluggable optical modules have limited heat sinking surface availability and use of a riding heatsink is not very effective in terms of heat conduction between surfaces. Thus, the surface temperature of the optical module may reach temperatures that are unsafe for human touch. For example, heat conduction within a metal shell of the pluggable optics body may result in the optical module reaching high temperatures, including a portion of the module that is outside of the chassis, which may reach temperatures above 55° C. and even up to 75° C. or higher. The problem is further compounded by the optical density on line cards, fabric cards, and route processor/controller cards. Since there is little room to work, a technician may hold onto whatever he can reach to remove the module. It is desired that a hold temperature of the pluggable optics in a 23° C. room environment not exceed 48° C. and the touch temperature not exceed 55° C.

The embodiments described herein reduce thermal exposure during module OIR (Online Insertion and Removal) to allow for safe touch of the module (e.g., optical module, line card, fabric card), while also allowing for heat to dissipate (escape) from the module. In one or more embodiments a thermal protective layer is provided that generally prevents human contact with an exposed metal surface of the module, while permitting thermal transfer from the external surface of the module to ambient air. The thermal protective layer may be used to prevent contact with any type of removable module that generates heat, including for example, optical modules, line cards, fabric cards, or other FRUs (Field Replaceable Units).

In one embodiment, the thermal protective layer is used to prevent contact with a portion of an optical module that extends from a network device. The optical module comprises a first end for insertion into the network device and a second end extending from the network device when the optical module is inserted into the network device. The thermal protective layer extends over a portion of the second end of the optical module and prevents direct contact with an external surface of the optical module to allow for removal of the optical module from the network device without contacting the external surface of the optical module. The thermal protective layer exposes a portion of the external surface of the second end of the optical module to allow heat to be released from the external surface of the optical module.

As described below, the thermal protective layer may comprise a sleeve extending over at least a portion of the module, or raised elements (ribs, ridges, dots, protruding members) distributed over at least a portion of the module to prevent direct contact with the surface, while allowing for heat dissipation from the surface.

It is to be understood that the term "module" as used herein refers to any modular electronic component, optical module, field replaceable unit, line card, fabric card, service card, router processor card, controller card, or other card, element, or component configured for insertion and removal from a chassis of a modular electronic system (network device).

Also, the term "layer" as used herein may refer to a layer of material (e.g., sleeve 12 in FIG. 1) or a plurality of independent elements (e.g., raised insulation members 53 in FIG. 5) distributed over the module to form the layer (cover). The term "openings" as used herein refers to areas or regions within the layer (e.g., mesh openings 18 in FIG. 1, area 58 between raised elements 53 in FIG. 5), in which the external surface of the module is exposed to ambient air. Thus, as described below, the openings (e.g., in sleeve or between raised elements) expose the external surface of the module to allow heat to be released from the external surface of the module.

Referring now to the drawings, and first to FIG. 1, a schematic side view of an optical module 10 comprising a thermal protective layer (cover, insulator, sleeve, safety layer) 12 is shown in accordance with one embodiment. The optical module 10 comprises a first end 14 for insertion into a network device (e.g., card of a modular electronic system) and a second end 15 extending from the network device when the optical module is inserted into the network device. The first end 14 of the optical module 10 comprises an electrical connector 16 (e.g., multiple contact edge type connector) and the second end 15 of the module comprises an optical connector 17 (e.g., MPO (Multi-fibre Push On) connector). In the example shown in FIG. 1, the optical module 10 comprises a pull-release handle 19. While the handle 19 may assist with insertion or removal of the optical module 10, removal of the module typically involves grabbing onto the case (second end 15) of the optical module.

The optical module 10 may be a pluggable transceiver module in any form factor (e.g., SFP (Small Form-Factor Pluggable), QSFP (Quad Small Form-Factor Pluggable), QSFP-DD, CFP (C Form-Factor Pluggable), CXP (100G/Common Transceiver Pluggable), and the like) operable within a network device. For example, the optical module may be plugged into a module based switch, router, or other optical platform port. A cable (not shown) connected to the module 10 at the optical connector 17 may carry, for example, data (e.g., Ethernet, fiber optics, optical array, fabric) or data and power. The optical transceiver module 10 operates as an engine that bidirectionally converts optical signals to electrical signals or in general as an interface to the network element copper wire or optical fiber. Hosts for the pluggable optical modules include line cards on a network device. The host may include a printed circuit board (PCB) and electronic components and circuits operable to interface telecommunications lines in a telecommunications network. The host may be configured to perform one or more operations and receive any number or type of pluggable transceiver modules 10 configured for transmitting and receiving signals.

As shown in FIG. 1, the thermal protective layer 12 extends over at least a portion of the second end 15 of the optical module 10 and prevents (e.g., generally inhibits, precludes, or minimizes) direct contact with an external surface of the optical module to allow for removal of the optical module from the network device without direct exposure to the high temperature external surface of the optical module. The thermal protective layer 12 prevents direct contact with the external surface, while maximizing thermal transfer of heat from the optical module 10 to ambient air. The thermal protective layer 12 comprises a plurality of openings 18 to allow heat to be released from the external surface of the optical module 10 and prevent temperature increase on the same surface due to trapped air between the optical module and the protective thermal layer 12. The openings 18 within the thermal protective layer 12 may be any size or shape suitable to prevent touch (e.g., finger) contact with the external surface of the optical module, while allowing heat convection to air through the sleeve openings and may be optimized to reduce contact temperature of the thermal protective layer 12 and maximize convection (or heat transfer) from the optical module.

In the example shown in FIG. 1, the thermal layer 12 comprises a sleeve formed from a plurality of ribs 13 to prevent surface contact between the layer 12 and optics 10. The sleeve 12 may extend substantially around the circumference of the exposed portion (second end 15) of the optical module 10. The sleeve 12 may be formed from any material having a sufficiently low thermal conductivity (e.g., thermoplastic material rated UL 94 VO flammability rating, or any other suitable material).

Figure 2A:
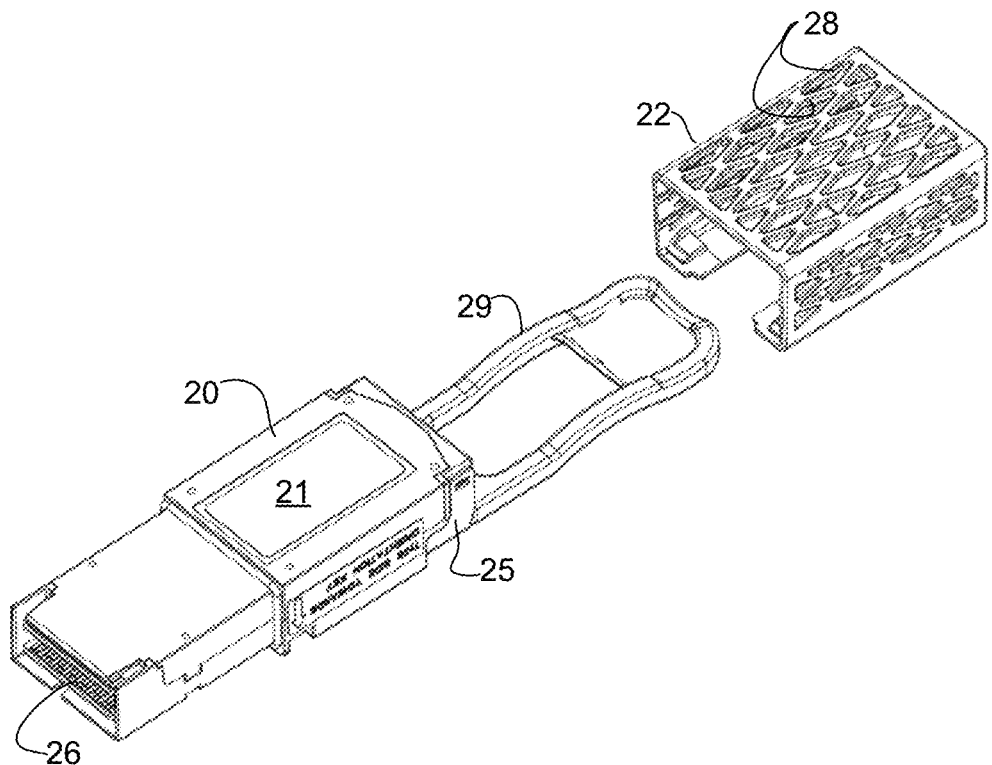
FIG. 2A is a top perspective of the thermal protective layer and the optical module.
Figure 2B:
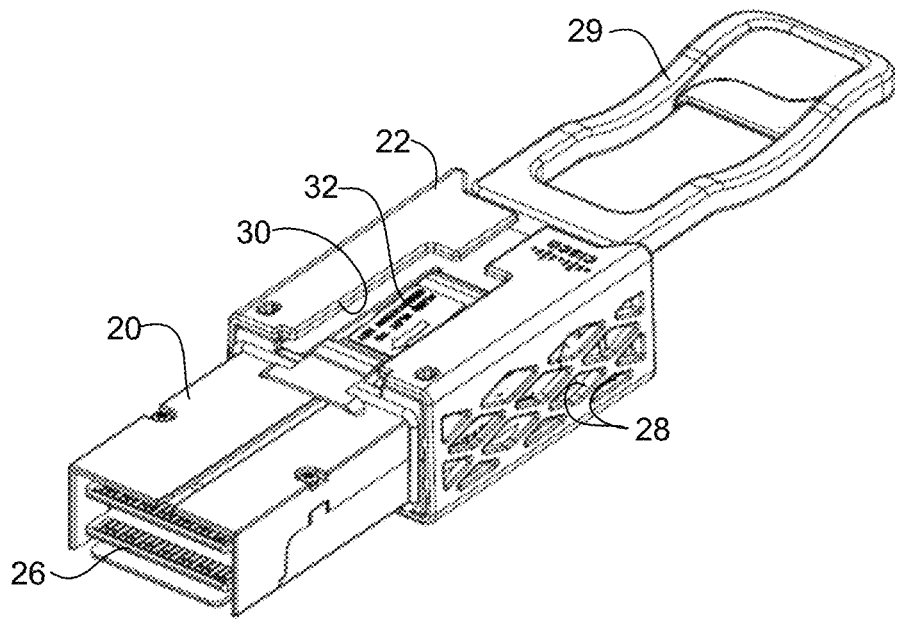
FIG. 2B is a bottom perspective of the thermal protective layer installed on the optical module.

FIGS. 2A and 2B illustrate one example of an optical module 20 and thermal protective layer 22, in accordance with one embodiment. In this example, the thermal protective layer 22 comprises a sleeve extending circumferentially around the second end 25 of the optical module. The sleeve 22 comprises a plurality of openings 28 to expose a portion of external surface 21 of the optical module. In this example, the sleeve 22 includes an opening 30 to allow a user to read a label 32 on the optical module 20. As described below with respect to FIG. 3, the sleeve 22 may be easily removed to provide access to the label 32, if the sleeve is configured without the opening 30. The module 20 further comprises an electrical connector 26, optical connector (not shown), and a handle 29, as previously described.

Figure 3:
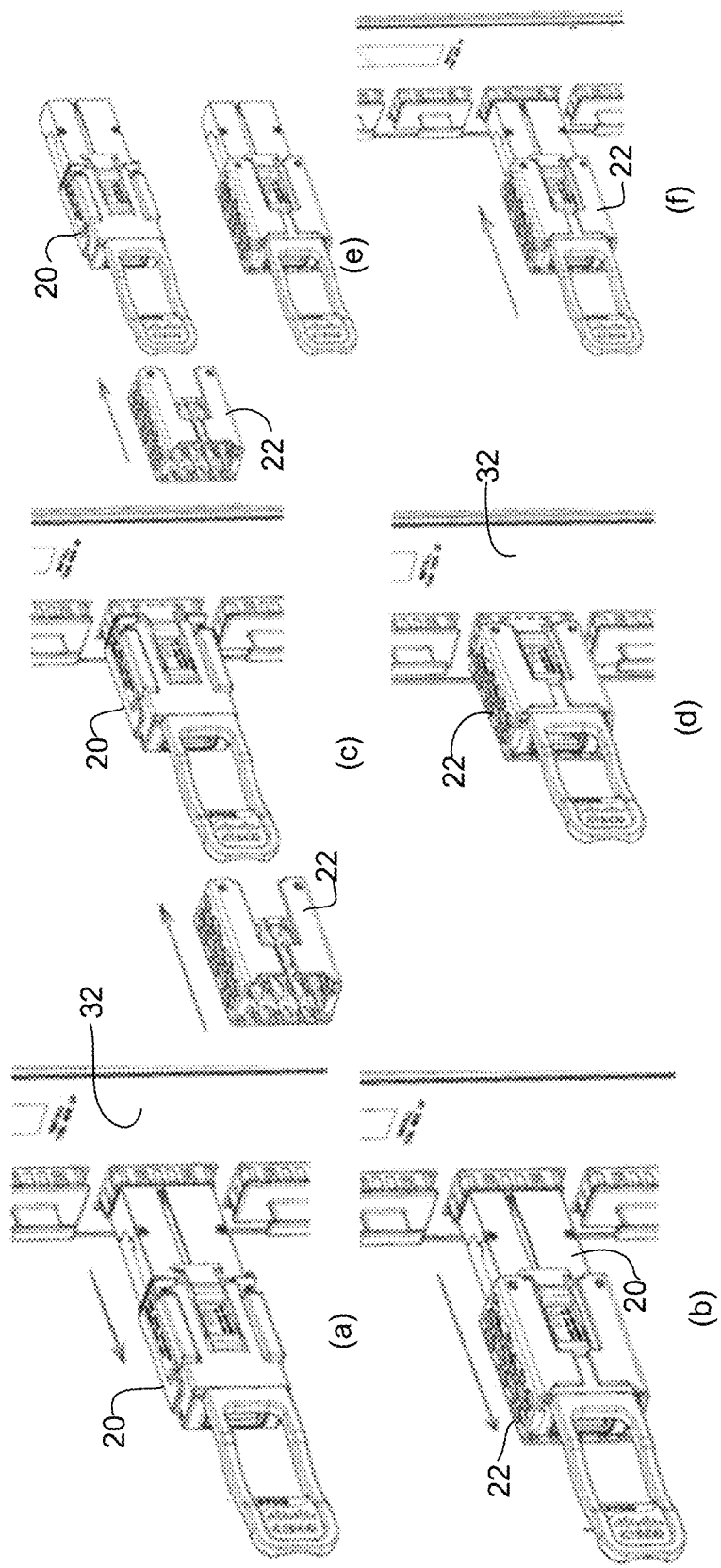
FIG. 3 illustrates installation of the thermal protective layer on the optical module and installation of the optical module in the network device.

FIG. 3 illustrates installation of the thermal protective layer 22 on the optical module 20 and insertion and removal of the optical module into and from a network device 32 (e.g., line card of the network device). The sleeve 22 may be slid onto the optical module 20 before it is inserted into the line card or after the module is inserted. Removal of the optical module 20 from the line card 32 is shown at (a) without the thermal protective layer and at (b) with the attached thermal protective layer 22. The sleeve 22 may be installed on the optical module 20 after the module is installed in the network device 32, as shown at (c) and (d). The sleeve 22 may also be attached to the optical module 20 before it is inserted into the line card as shown at (e) and then the entire assembly inserted into the line card, as shown at (f).

Figure 4A:
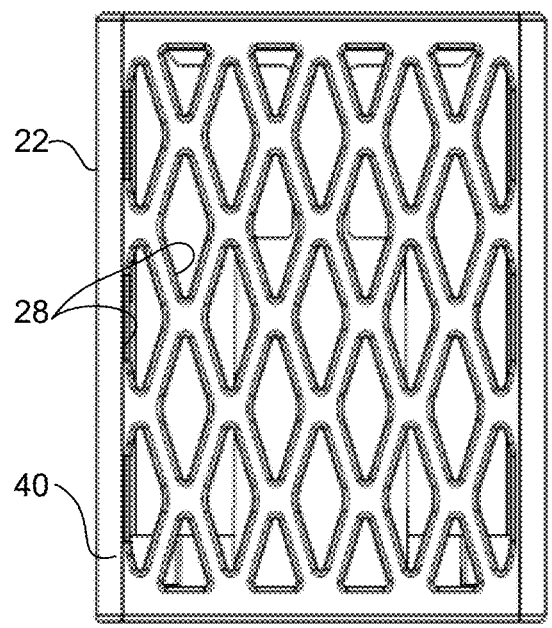
FIG. 4A is a top view of the thermal protective layer shown in FIG. 2A.
Figure 4B:
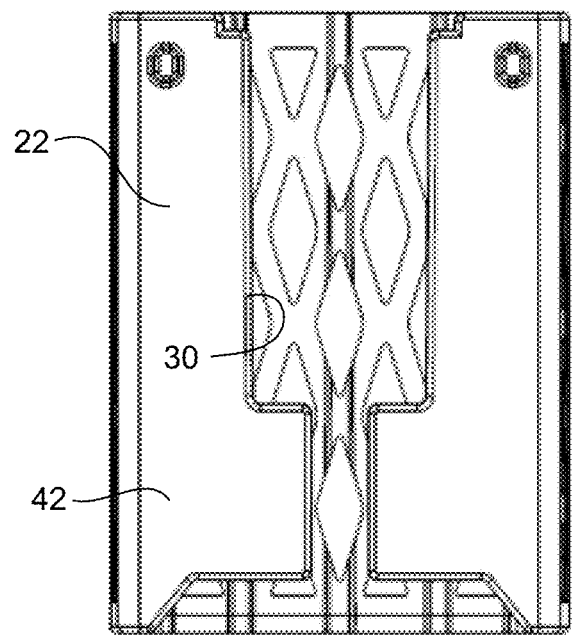
FIG. 4B is a bottom view of the thermal protective layer shown in FIG. 2B.
Figure 4C:
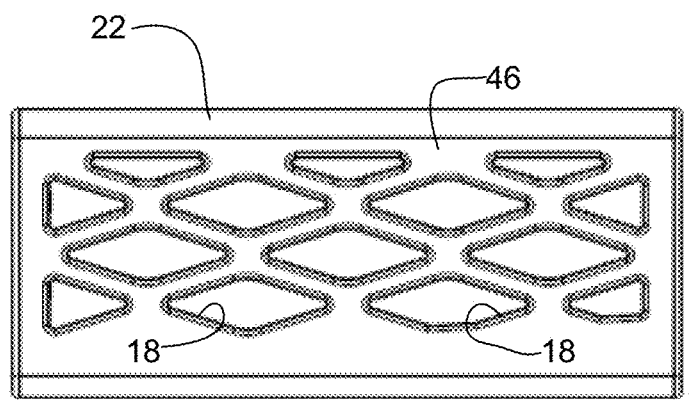
FIG. 4C is a side view of the thermal protective layer of FIG. 4A.
Figure 4D:
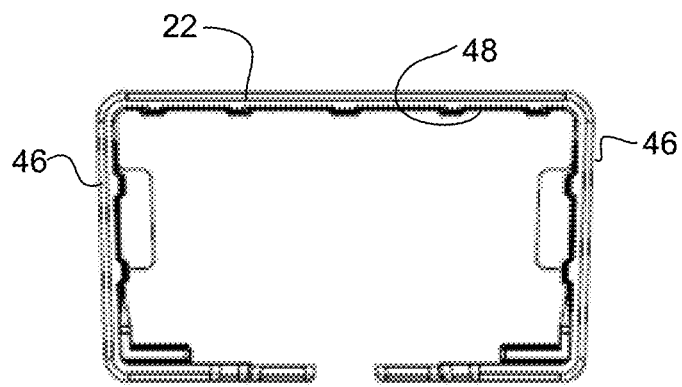
FIG. 4D is a front view of the thermal protective layer of FIG. 4A.

FIG. 4A is a top view, FIG. 4B is a bottom view, FIG. 4C is a side view, and FIG. 4D is a front view of the thermal protective layer 22 shown in FIGS. 2A, 2B and 3. It is to be understood that the terms top, bottom, and side as used herein are relative terms used to describe the various views and the module 20 may be inserted into the network device in any orientation.

In the example shown in FIGS. 4A-4D, the thermal protective layer 22 comprises generally diamond shaped openings 28 to allow exposure of the optical module 20 to ambient air while limiting any increase in temperature of the optical module 20 due to the sleeve 22. The diamond shaped openings 28 provide vents that are optimized to allow heat transfer to the air (or convecting heat) while preventing finger touch of the metal surface of the optical module 20. In the example shown in FIGS. 4A-4D, the openings 28 cover a front 40 and sides 46 of the sleeve. In the example shown in FIGS. 2B and 4B, a bottom 42 of the sleeve 22 does not include openings 28, but includes an opening 30 to allow viewing of the label 32 affixed to the module 20. In one or more embodiments, the side walls 46 may be tapered to ensure retention of the sleeve on the optical module, as shown in FIG. 4D. Central opening 48 in the sleeve 22 is sized for insertion and removal of the module, while preventing the sleeve from inadvertent removal from the module.

It is to be understood that the mesh pattern of openings 28 shown in FIGS. 2A-4D is only an example and that other patterns or shapes and sizes of the openings may be used, without departing from the scope of the embodiments.

Figure 5:
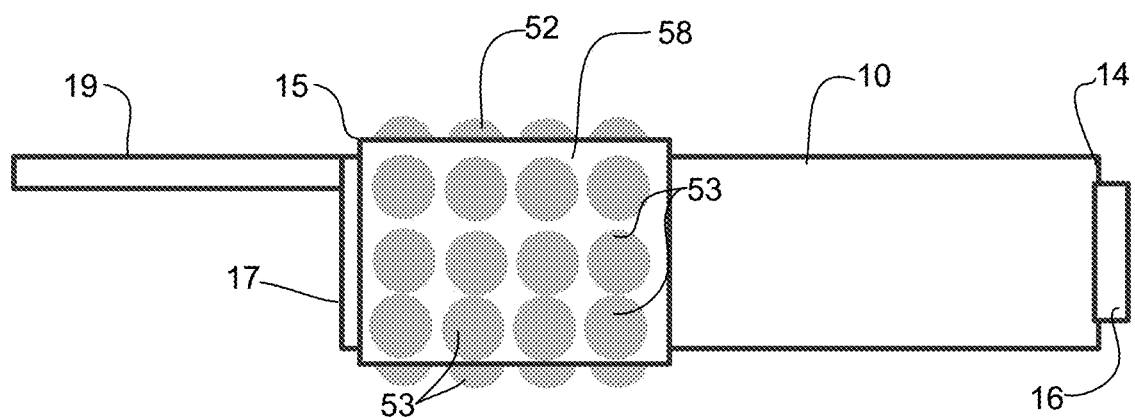
FIG. 5 is a schematic illustrating a thermal protective layer on the optical module, in accordance with another embodiment.

FIG. 5 schematically illustrates another example of a thermal protective layer 52, in accordance with one embodiment. In the example shown in FIG. 5, the thermal protective layer 52 comprises a plurality of raised elements 53 distributed on the external surface of the optical module 10 to prevent direct contact with the external surface of the optical module and define a plurality of openings (open areas) 58 on the optical module to allow heat dissipation from the exposed external surface of the second end 15 of the optical module. As described below, the insulation members 53 may be clear to allow viewing of a label or other markings on the module 10.

Figure 6:
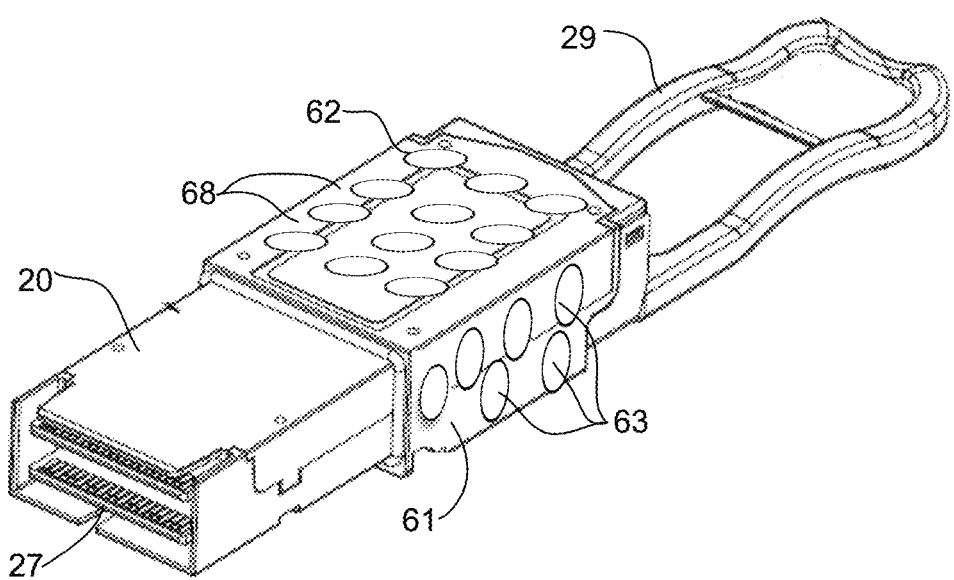
FIG. 6 is a perspective of the thermal protective layer on the optical module.

FIG. 6 is a perspective of a thermal protective layer 62 on the optical module 20, in accordance with one embodiment. In one or more embodiments, a dot pattern of raised elements 63 is applied to the metal surface of the optical module 20 with a specific minimum height in a spaced pattern designed to prevent direct skin contact with exposed metal surface 61 during removal of an active optics module, thereby preventing skin burning or other injury. As described below, clear dot printing may be used such that the label for the optics module may be covered with the isolating dots and not prevent the user from reading label information.

It is to be understood that the shape, size, number, arrangement and spacing of elements 63 shown in FIG. 6 is only an example and other configurations may be used without departing from the scope of the embodiments.

In one or more embodiments, the raised elements 63 may comprise a 0.2 mm to 0.5 mm (or any other dimension) dot height. The raised portion may comprise multiple bumps of a thermal and electrical isolator, such as clear RTV (Room Temperature Vulcanizing) or clear epoxy, in a pattern around the case of the optical module 20. Application of the insulator 62 in a pattern such as dots may allow up to 60% or more of the case to be accessible to ambient air to provide cooling. The 40% or less of raised dots 63 allows for touch to come within 0.2 mm to 0.5 mm, for example, from the metal surface of the optics, thus preventing a technician (operator, user) from touching the hot (e.g., 75° C.) metal surface 61.

There are several ways that the raised elements (e.g., dots) 63 may be applied on the optical module case. In one example, a printing technique may be used. For example, an ink jet or wax jet cartridge may be used to print the dots 63. A stencil may be used to apply the dots 63. It is to be understood that this is only an example and any other suitable machine or printing technique may be used.

Manufacturing processes for depositing a thin layer on the metallic (solid) surfaces 61 of the optical module 20 may include depositing thin layers of liquid/semi-liquid on the solid surface. The following techniques are examples that may be used for depositing die attach material or integrated passive etching of the electronic packaging. The same techniques may also be used for depositing TIM (Thermal Interface Materials). In one example, liquid or gel dispensing machines may be used. Most of the features achieved through stencil printing techniques may also be achieved through dispensing techniques.

The following describes a stencil printing technique that may be used to deposit the dots (raised elements) 63. The stencil design is preferably configured such that the user will not be able to touch the metal surface 61, while simultaneously no significantly deterioration of thermal performance should occur. This may be achieved using smaller dots; however, this may be limited by manufacturing techniques.

A stencil design with holes is first prepared. The stencil thickness may be configured such that a height of the dot is equal to a thinness of the stencil. For example, the thinness of stencil may be 1.0 mm (for an embodiment in which maximum allowable space between the module and another component is about 2.5 mm). The diameter of the hole may be 2.0 mm, for example. This dimension is mainly dependent on the material used for dispensing. The dispensing material may be a highly viscous material, for example. Pitch of the holes may be such that the user should not touch the metal surface (e.g., 3.5 mm). It is to be understood that these dimensions are only examples and that other dimensions or shapes may be used without departing from the scope of the embodiments. A 3D printer may be used to print the stencil.

Once the stencil is prepared, the deposition may take place at room temperature. Deposition of material for the intended surface using the process may be similar to stencil printing. Drying may take place at 50 to 60° C., for example.

In one or more embodiments, if a sticker or label on the external surface of the optical module prevents deposition of the material, the label may be removed. If legends or markings cause performance degradation then they can be exempted from the deposition process. In another example, the labels (stickers) may be retained on the module. As stickers are plastic elements, they will typically have high threshold values for maximum allowable touch temperature.

In another example, an overmolding process, in which a single part is created using two or more different materials in combination, may be used to apply a sleeve or pattern on the module. For example, a substrate may be partially covered by subsequent materials (overmold materials) during the manufacturing process.

It is to be understood that the process described above for application of the thermal protective layer 62 is only an example and that other processes may be used without departing from the scope of the embodiments.

Figure 7:
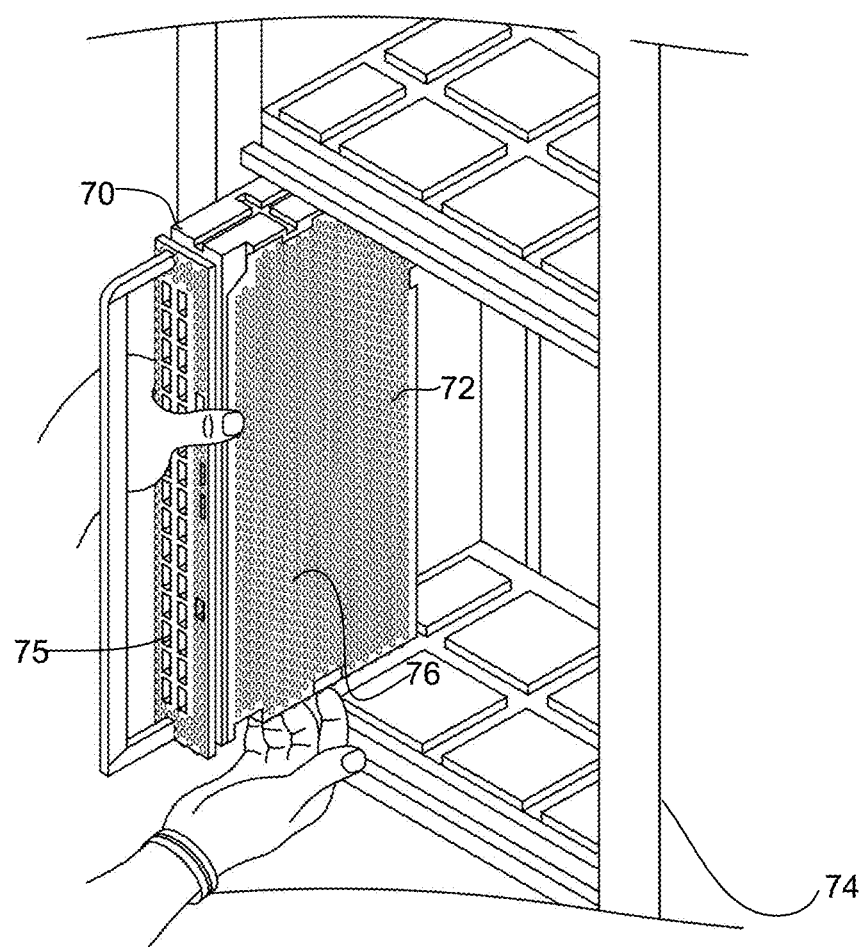
FIG. 7 is a perspective illustrating removal of a card having a thermal protective layer from a chassis.

FIG. 7 illustrates another embodiment of a thermal protective layer 72 applied to a module (e.g., line card, fabric card) 70 inserted into a chassis 74 of a network device. In this example, the thermal protective layer 72 comprises insulator material (e.g., dots) as described above with respect to FIG. 6. The protective layer 72 may also comprise a spray on material, which leaves at least a portion of the surface exposed to provide heat dissipation from the module. In the example shown in FIG. 7, the thermal protective layer 72 is applied to a front face plate 75 and at least one side 76 of the module 70. It is to be understood that this is only an example and that one or more of the surfaces of the module may be covered by the thermal protective layer 72 and any portion of the surfaces may be covered with the thermal protective layer. For example, the thermal protective layer 72 may extend only over an edge margin of the surface 76 of the network device 70.

As previously noted, the exposed external surface of the module (e.g., surfaces 21, 61 of the optical module 10 shown in FIGS. 2A and 6) may reach a temperature as high as 75° C., for example. Exposure to a surface at this temperature or higher may become a safety issue for human touch. Thus, without the thermal protective layer 22, 62, 72 it may be dangerous for a technician to remove the module 20, 70 that was recently in operation. In one or more embodiments, the thermal protective layer allows modules to meet a 48° C. human touch safety requirement for dense optical applications.

In one example, a temperature probe with a 6 mm diameter touch surface may be used to test the module and thermal protective layer for a specified touch temperature. In one or more embodiments, the openings on the thermal protective layer are configured such that the probe tip does not touch any metal surface that is higher than 48° C. This ensures that the temperature of the thermal protective layer is at or below 48° C. and safe to hold during module removal. In one example, the thermal protective layer allows 80% thermal transfer to ambient air, while preventing human touch during module online removal.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data over one or more networks. One or more of the network devices may comprise a modular electronic system comprising one or more modules with a thermal protective layer described herein. The network device may include one or more processor, memory, and network interfaces, with one or more of these components located on a module (e.g., line card, fabric card) removably inserted into the network device. The network devices may communicate over or be in communication with one or more networks, which may include any number or arrangement of network communications devices (e.g., switches, access points, routers, or other devices) operable to route (switch, forward) data communications.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
   an optical module comprising a first end for insertion into a network device and a second end extending from the network device when the optical module is inserted into the network device; and
   a thermal protective layer extending over a portion of said second end of the optical module, the thermal protective layer preventing direct contact with an external surface of the optical module during removal of the optical module from the network device;
   wherein the thermal protective layer comprises a sleeve extending circumferentially around at least a portion of the optical module and in direct contact with said second end of the optical module, and wherein the thermal protective layer exposes a portion of the external surface of said second end of the optical module to allow heat to be released from the external surface of the optical module.

2. The apparatus of claim 1 wherein the sleeve comprises a plurality of openings exposing the external surface of the optical module.

3. The apparatus of claim 1 wherein the thermal protective layer comprises a thermoplastic material.

4. The apparatus of claim 1 wherein a temperature of an outer surface of the thermal protective layer does not exceed 48° C. during operation of the optical module.

5. An apparatus comprising:
   an optical module comprising a first end for insertion into a network device and a second end extending from the network device when the optical module is inserted into the network device; and
   a thermal protective layer extending over a portion of said second end of the optical module, the thermal protective layer preventing direct contact with an external surface of the optical module during removal of the optical module from the network device;
   wherein the thermal protective layer exposes a portion of the external surface of said second end of the optical module to allow heat to be released from the external surface of the optical module, and wherein the thermal protective layer comprises a plurality of raised elements disposed over a portion of said second end of the optical module.

6. The apparatus of claim 5 wherein the raised elements extend between approximately 0.2 mm to 0.5 mm from the external surface of the optical module.

7. The apparatus of claim 5 wherein the raised elements comprise a plurality of dots disposed in a pattern on the external surface of the optical module.

8. The apparatus of claim 5 wherein the raised elements comprise a clear epoxy.

9. The apparatus of claim 5 wherein the raised elements are applied to the external surface of the optical module using a printing process.

10. An apparatus comprising:
a module for insertion into a modular electronic system; and
a thermal protective layer extending over at least a portion of an external surface of the module, the thermal protective layer preventing direct contact with an external surface of the module during removal of the module from the modular electronic system;
wherein the thermal protective layer exposes a portion of the external surface of the module to allow heat to be released from the external surface of the module and wherein the module comprises a line card and the thermal protective layer is in direct contact with the line card, and wherein the thermal protective layer comprises a plurality of raised elements disposed over a portion of the module.

11. The apparatus of claim 10 wherein the thermal protective layer extends over at least a portion of a face plate and one other surface of the module.

12. The apparatus of claim 10 wherein the raised elements extend between approximately 0.2 mm to 0.5 mm from the external surface of the module.

13. The apparatus of claim 10 wherein the raised elements are applied to the external surface of the module using a printing process.

14. An apparatus comprising:
a chassis;
a plurality of cards inserted into the chassis; and
a plurality of optical modules each comprising a first end inserted into one of the cards and a second end extending from the card;
wherein a thermal protective layer extends over at least a portion of said second end of each of the optical modules, the thermal protective layer preventing direct contact with an external surface of the optical module during removal of the optical module from the modular chassis;
wherein the thermal protective layer exposes a portion of the external surface of said second end of the optical module to allow heat to be released from the external surface of the optical module.

15. The apparatus of claim 14 wherein the thermal protective layer comprises a sleeve extending circumferentially around at least a portion of the optical module and in direct contact with said second end of the optical module.

16. The apparatus of claim 14 wherein the thermal protective layer comprises a plurality of raised elements disposed over a portion of the optical module.

17. The apparatus of claim 14 wherein the thermal protective layer extends over at least a portion of the card.

18. An apparatus comprising:
an optical module comprising a first end for insertion into a network device and a second end extending from the network device when the optical module is inserted into the network device; and
a thermal protective layer extending over a portion of said second end of the optical module, the thermal protective layer preventing direct contact with an external surface of the optical module during removal of the optical module from the network device;
wherein the thermal protective layer exposes a portion of the external surface of said second end of the optical module to allow heat to be released from the external surface of the optical module, and wherein the thermal protective layer comprises a plurality of openings defining a spaced pattern on at least one surface of the optical module.

* * * * *